(12) United States Patent
Inage et al.

(10) Patent No.: US 7,102,859 B2
(45) Date of Patent: Sep. 5, 2006

(54) THIN-FILM MAGNETIC HEAD WITH TUNNEL MAGNETORESISTIVE EFFECT ELEMENT ELECTRICALLY CONNECTED IN PARALLEL WITH A RESISTOR ELEMENT

(75) Inventors: Kenji Inage, Tokyo (JP); Shunji Saruki, Tokyo (JP); Nozomu Hachisuka, Tokyo (JP)

(73) Assignee: TDK Corporation, Tokyo (JP)

( * ) Notice: Subject to any disclaimer, the term of this patent is extended or adjusted under 35 U.S.C. 154(b) by 416 days.

(21) Appl. No.: 10/765,159

(22) Filed: Jan. 28, 2004

(65) Prior Publication Data

US 2004/0185304 A1    Sep. 23, 2004

(30) Foreign Application Priority Data

Jan. 30, 2003 (JP) .............................. 2003-022003

(51) Int. Cl.
*G11B 5/39* (2006.01)

(52) U.S. Cl. .................................................. 360/324.2
(58) Field of Classification Search .................... None
See application file for complete search history.

(56) References Cited

U.S. PATENT DOCUMENTS

2004/0264067 A1* 12/2004 Lin et al. .................. 360/324.2

FOREIGN PATENT DOCUMENTS

| JP | 10-233011 | 9/1998 |
| JP | 2002-217471 | 8/2002 |

* cited by examiner

*Primary Examiner*—A. J. Heinz
(74) *Attorney, Agent, or Firm*—Oblon, Spivak, McClelland, Maier & Neustadt, P.C.

(57) ABSTRACT

A thin-film magnetic head includes a TMR element and a resistor element connected in parallel with the TMR element. A resistance value $R_{TMR}$ of the TMR element itself is $R_{TMR} \geq 240\ \Omega$, a product RA of the resistance value of the TMR element itself and a cross-sectional area of the TMR element is $RA \geq 3\ \Omega \cdot \mu m^2$, and a resistance value $R_{PARA}$ of the resistor element is $R_{PARA} \leq 480\Omega$.

8 Claims, 3 Drawing Sheets

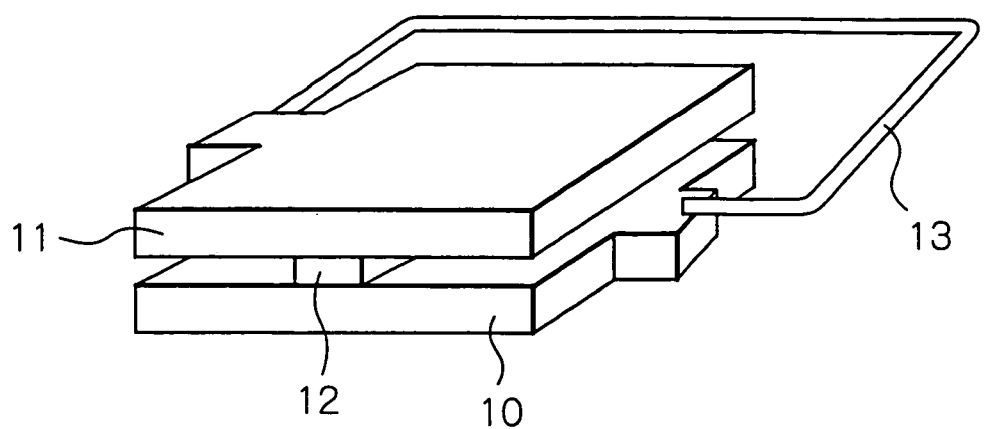
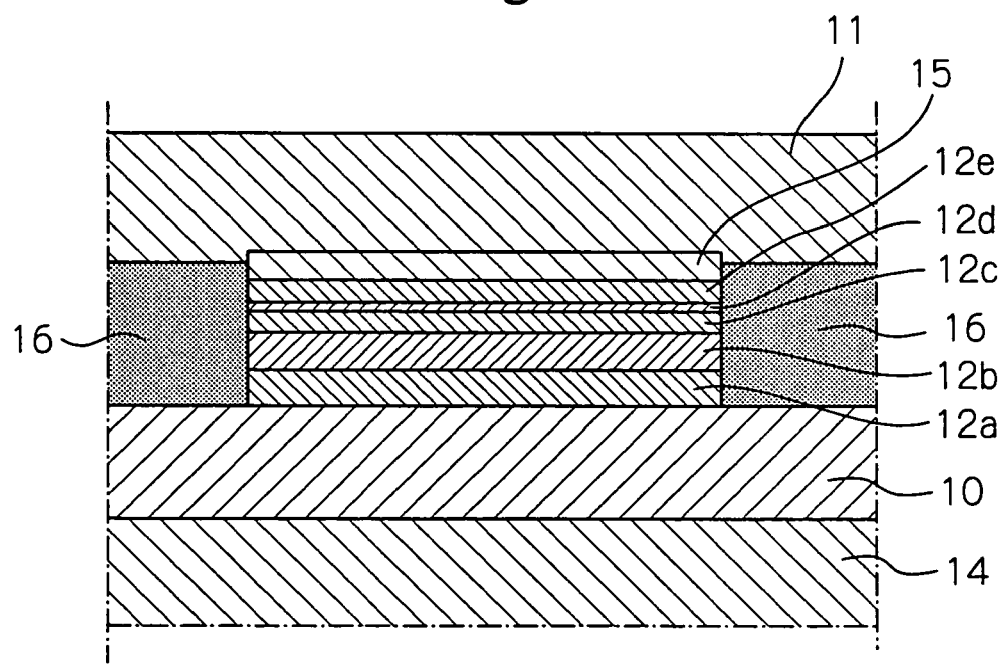

THIN-FILM MAGNETIC HEAD WITH TUNNEL MAGNETORESISTIVE EFFECT ELEMENT ELECTRICALLY CONNECTED IN PARALLEL WITH A RESISTOR ELEMENT

BACKGROUND OF THE INVENTION

1. Field of the Invention

The present invention relates to a thin-film magnetic head with a tunnel magnetoresistive effect (TMR) element.

2. Description of the Related Art

It has been demanded to enhance reading performance of a thin-film magnetic head with increase in a disk recording density of a hard disk drive (HDD). To satisfy such demand of enhancement in the reading performance, widely used is a magnetoresistive effect (MR) head provided with an MR read head element or a giant magnetoresistive effect (GMR) head with a GMR read head element.

In fabricating such MR head or GMR head, since the dimension of the head element namely the MR or GMR element is small whereas the dimension of electrode terminals electrically connected to the MR or GMR element is large, electrostatic discharge may occur to pass electrical charges through the MR or GMR element causing the element to deteriorate or damage.

To prevent such electrostatic damage of the head element, Japanese patent publication No. 10233011A discloses a magnetic head provided with a resistor element of 500Ω to 10 kΩ connected between lead conductors or electrode terminals of an MR element or GMR element for feeding the electrostatic charges there through.

Recently, a TMR head with a TMR element, which can deliver two or more times the MR ratio of the GMR head is aggressively developed. The TMR head has a fundamentally different structure from that of the MR head and the GMR head. For example, in the TMR element, there is an insulation barrier layer and the sense current flows in a direction perpendicular to planes of laminated layers. Thus, the TMR head has considerably different characteristics from that of the MR head and the GMR head. For example, although the MR head and the GMR head have element resistances of about 10–50Ω, the TMR head has a higher element resistance than them by an order of magnitude.

In order to achieve higher recording density, recent magnetic heads are required to have a narrower track width and a lower height causing the element resistance of the TMR element to more increase. With the increase in the element resistance of the TMR element, the cutoff frequency thereof decreases and therefore it is difficult to comply with the high recording density.

It is known that a withstand voltage of the TMR element with the current size (element width and element height) is lower than that of the GMR element with the same size. Therefore, if the element size of the TMR element reduces, not only breakdown of the element may easily occur but also its applicable margin will be lowered due to the reduced current capacity that is caused by increase in the element resistance and by decrease in the breakdown voltage. Furthermore, in case that the element size of the TMR element reduces, resistance variation between the TMR elements will be easily induced even if they are fabricated under the same precision. This variation in element resistance becomes a serious problem in the manufacturing of a TMR head.

For such TMR head, it is impossible to prevent electrostatic destruction (ESD) with reliability even if a resistor element with a resistance value of 0.5–10 kΩ is connected in parallel with the TMR element as described in Japanese patent publication No. 10233011A, or a resistor element with a higher resistance value of 5–100 kΩ is connected in parallel with the TMR element. Also, if the resistor element connected in parallel with the TMR element has a high resistance value as described in Japanese patent publication No. 10233011A, an apparent resistance value of the TMR head that is a combined resistance value $R_{TOTAL}$ of a resistance value of the TMR element and a resistance value of the connected resistor element becomes high causing the cutoff frequency of the TMR head to prevent from increasing.

BRIEF SUMMARY OF THE INVENTION

It is therefore an object of the present invention to provide a thin-film magnetic head with a TMR element, whereby ESD of the TMR element can be prevented from occurring and a cutoff frequency thereof can be increased.

According to the present invention, a thin-film magnetic head includes a TMR element and a resistor element connected in parallel with the TMR element. A resistance value $R_{TMR}$ of the TMR element itself is $R_{TMR} \geq 240\Omega$, a product RA of the resistance value of the TMR element and a cross-sectional area of the TMR element is $RA \geq 3\ \Omega \cdot \mu m^2$, and a resistance value $R_{PARA}$ of the resistor element is $R_{PARA} \leq 480\Omega$.

Also, according to the present invention, a thin-film magnetic head includes a TMR element and a resistor element connected in parallel with the TMR element. A resistance value $R_{TMR}$ of the TMR element itself is $R_{TMR} \geq 240\Omega$, a product RA of the resistance value of the TMR element and a cross-sectional area of the TMR element is $RA \geq 3\ \Omega \cdot \mu m^2$, and a combined resistance value $R_{TOTAL}$ of the resistance value $R_{TMR}$ of the TMR element and a resistance value of the resistor element is $R_{TOTAL} \leq 160\Omega$.

From a view point of reliability under operating environments of the TMR head, 300 mV or more breakdown voltage of the TMR element is required. If determined as $RA \geq 3\ \Omega \cdot \mu m^2$, this requirement can be satisfied. Also, if determined as $R_{TOTAL} \leq 160\Omega$, a cutoff frequency at 1 GHz or more can be achieved. Since the optical track width $W_{TMR}$ of a high recording density capable TMR head is $W_{TMR} \leq 0.11\ \mu m$ and an element height $W_H$ thereof is $W_H \leq 0.11\ \mu m$, the resistance value $R_{TMR}$ of the TMR element itself becomes $R_{TMR} \geq 240\Omega$ if $RA \geq 3\ \Omega \cdot \mu m^2$. In this case, the resistance value $R_{PARA}$ of the resistor element is set as $R_{PARA} \leq 480\Omega$. Under these conditions, if the parallel resistor element is provided, both of mutually contradict requirements, that are prevention of ESD of the TMR element and increase in cutoff frequency of the TMR head, can be satisfied.

It is preferred that the thin-film magnetic head further includes an upper electrode layer and a lower electrode layer connected to the TMR element, and that the resistor element is formed between the upper electrode layer and the lower electrode layer.

It is also preferred that the thin-film magnetic head further includes electrode terminals and lead conductors connected between the TMR element and the electrode terminals, and that the resistor element is formed between the lead conductors.

It is further preferred that the TMR element further includes a multi-layered structure of an under layer, a pinning layer, a pinned layer, a tunnel barrier layer and a free layer which are sequentially laminated.

Further objects and advantages of the present invention will be apparent from the following description of the preferred embodiments of the invention as illustrated in the accompanying drawings.

BRIEF DESCRIPTION OF THE SEVERAL VIEWS OF THE DRAWINGS

FIG. 1 shows an oblique view schematically illustrating a configuration of a TMR element part of a TMR head as a preferred embodiment according to the present invention;

FIG. 2 shows a sectional view illustrating a layer structure example of the TMR element in the embodiment of FIG. 1;

DETAILED DESCRIPTION OF THE INVENTION

Figure 3:
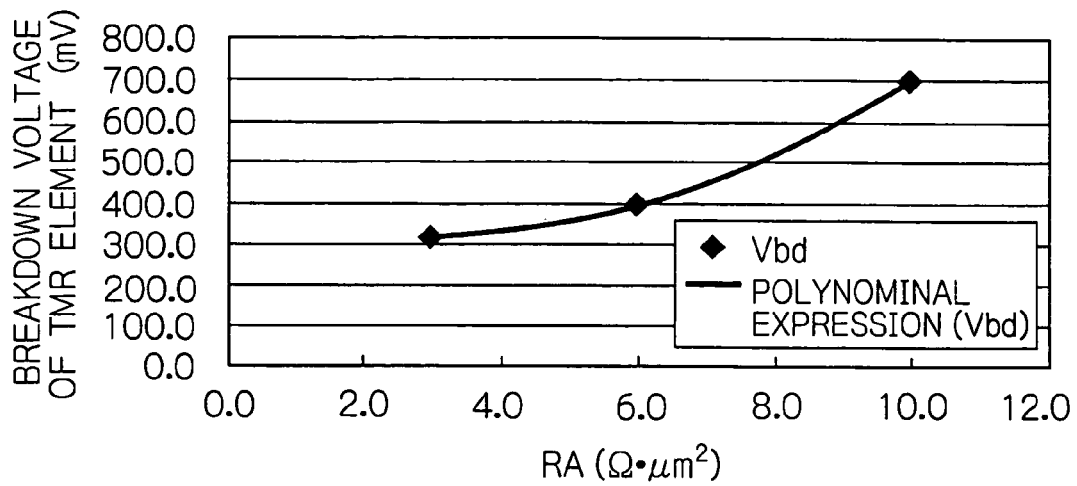
FIG. 3 illustrates characteristics of a breakdown voltage of the TMR element with respect to a product RA of a resistance value $R_{TMR}$ of the TMR element itself and a sectional area of the TMR element.

FIG. 1 schematically illustrates a configuration of a TMR element part of a TMR head as a preferred embodiment according to the present invention, and FIG. 2 illustrates a layer structure example of this TMR element.

In FIG. 1, reference numeral 10 denotes a lower electrode layer, 11 denotes an upper electrode layer, 12 denotes a TMR multilayer sandwiched between the lower and upper electrode layers 10 and 11, and 13 denotes a resistor element electrically connected across the lower and upper electrode layers 10 and 11 in parallel with the TMR multilayer 12, respectively.

As shown in FIG. 2, the lower electrode layer 10 that also serves as a magnetic shield layer is laminated on an insulation layer 14. On the lower electrode layer 10, the TMR multilayer 12 with a multi-layered structure of an under layer 12a, a pinning layer 12b, a pinned layer 12c, a tunnel barrier layer 12d and a free layer 12e which are sequentially laminated is formed. On the TMR multilayer 12, a cap layer 15 and the upper electrode layer 11 that also serves as a magnetic shield layer are laminated. An insulation layer 16 is formed to surround the TMR multilayer 12 and the cap layer 15.

A resistance value $R_{TMR}$ of a TMR element itself that includes the above-mentioned TMR multilayer 12 is $R_{TMR} \geq 240\Omega$, a product RA of the resistance value $R_{TMR}$ of the TMR element itself and a cross-sectional area of the TMR element is $RA \geq 3\ \Omega \cdot \mu m^2$, a combined resistance value $R_{TOTAL}$ of the resistance value $R_{TMR}$ and a resistance value $R_{PARA}$ of the resistor element 13 is $R_{TOTAL} \leq 160\Omega$, and the resistance value $R_{PARA}$ of the resistor element 13 is $R_{PARA} \leq 480\Omega$.

These numerical values are derived from the following grounds.

FIG. 3 illustrates characteristics of a breakdown voltage Vbd of the TMR element with respect to a product RA of the resistance value $R_{TMR}$ of the TMR element itself and a sectional area of the TMR element.

In the TMR element, due to the characteristics of the tunnel barrier layer 12d, the breakdown voltage Vbd of the TMR element becomes higher with the increase in the product RA. Therefore, from a view point of reliability, higher RA is desired.

In concrete, the breakdown voltage of the TMR element is 320 mV at $RA = 3\ \Omega \cdot \mu m^2$. Therefore, if determined as $RA \geq 3\ \Omega \cdot \mu m^2$, requirements for the breakdown voltage of the TMR element under operating environments, that is 300 mV or more breakdown voltage, can be sufficiently satisfied.

Figure 4:
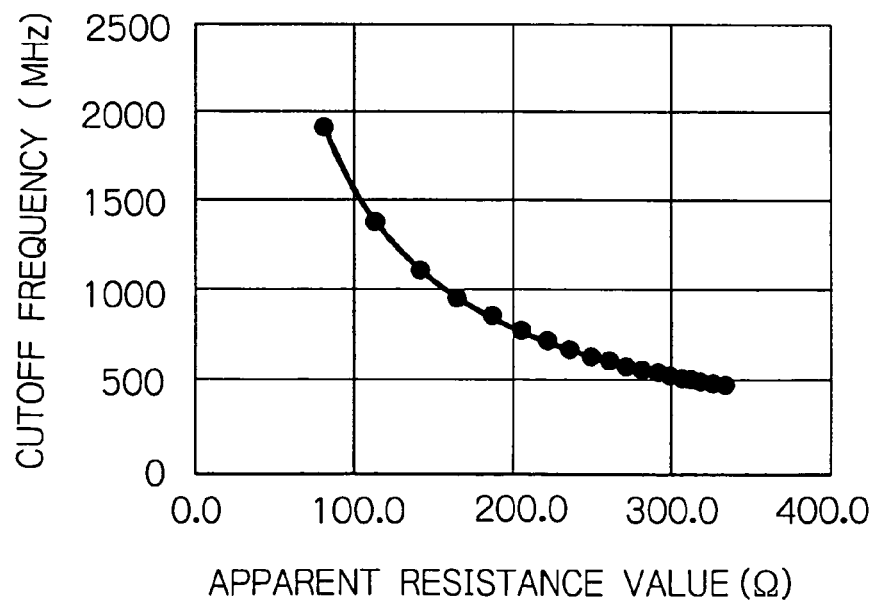
FIG. 4 illustrates characteristics of a cutoff frequency of the TMR head with respect to an apparent resistance value of the TMR element.

FIG. 4 illustrates characteristics of a cutoff frequency of the TMR head with respect to an apparent resistance value of the TMR element, where a capacitance value of the TMR head is set as 1 pF.

Output gain of the TMR head lowers when the recording frequency is close to the cutoff frequency of the TMR head, and the output of the TMR head is limited when exceeds the cutoff frequency causing the head output performance to deteriorate. Thus, it is required that the cutoff frequency is enough higher than the operating frequency region of the TMR head. As is well-known, the cutoff frequency $f_{cut}$ is defined as $f_{cut} = 1/(2\pi RC)$, where R represents an apparent resistance value of the TMR head and C represents a capacitance value of the TMR head.

Future TMR head will be required to have a narrower track density so as to comply with high recording density, and thus it is necessary to operate at 1 GHz at minimum. Therefore, the cutoff frequency should be 1 GHz or more. From FIG. 4, in order to make the cutoff frequency at 1 GHz or more, the apparent resistance value of the TMR head should be about 160Ω or less.

As aforementioned, it is desired that the TMR head has a larger RA to improve the breakdown voltage. Contrary to this, a lower apparent resistance value of the TMR head is desired to improve the cutoff frequency. Therefore, in order to satisfy both of these requirements, the resistor element is connected in parallel with the TMR element of the TMR head so that the apparent resistance value of the TMR element, namely the combined resistance value $R_{TOTAL}$ of a resistance value of the TMR element itself and a resistance value of the resistance element, becomes as $R_{TOTAL} \leq 160\Omega$, and that the product RA of the resistance value $R_{TMR}$ and a cross-sectional area of the TMR element becomes $RA \geq 3\ \Omega \cdot \mu m^2$. Since the optical track width $W_{TMR}$ of a high recording density capable TMR head is $W_{TMR} \leq 0.11\ \mu m$ and an element height $W_H$ thereof is $W_H \leq 0.11\ \mu m$, the resistance value $R_{TMR}$ of the TMR element itself becomes $R_{TMR} \geq 240\Omega$ in case of $RA \geq 3\ \Omega \cdot \mu m^2$.

Figure 5:
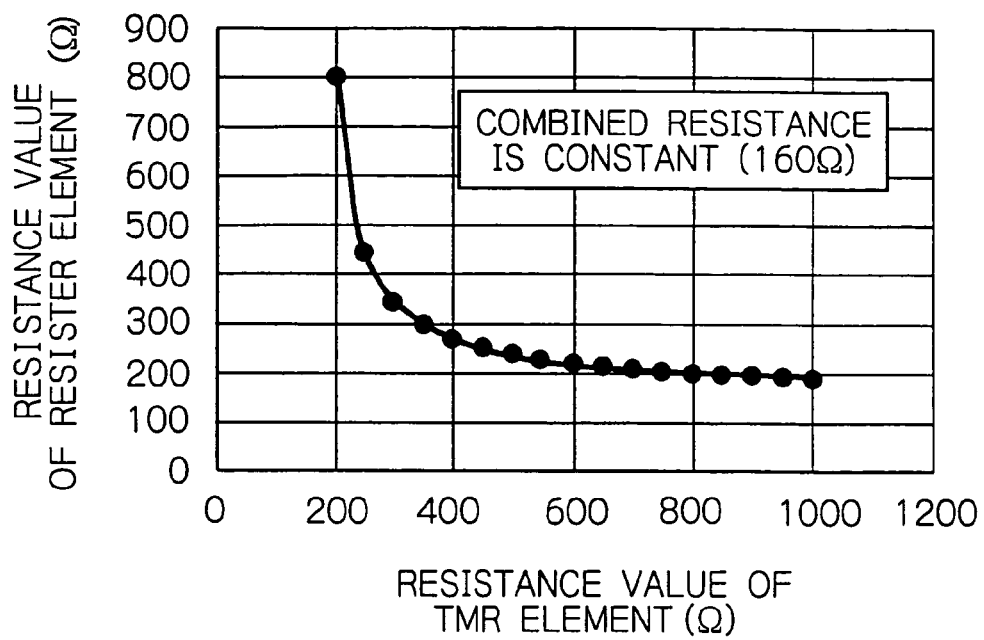
FIG. 5 illustrates characteristics of a resistance value of the resistor element $R_{PARA}$ with respect to the resistance value $R_{TMR}$ of the TMR element itself.

FIG. 5 illustrates characteristics of a resistance value of the resistor element $R_{PARA}$ with respect to the resistance value $R_{TMR}$ of the TMR element itself, where the cutoff frequency is 1 GHz and therefore the combined resistance value $R_{TOTAL}$ of a resistance value of the TMR element and a resistance value of the resistance element is constant as $R_{TOTAL} = 160\Omega$.

As will be noted from this figure, in case of $R_{TMR} \geq 240\ \Omega$ and $R_{TOTAL} \leq 160\Omega$, the resistance value of the resistor element 13 $R_{PARA}$ becomes as $R_{PARA} \leq 480\Omega$. Under this condition, both the cutoff frequency and the breakdown voltage can be improved.

Figure 6:
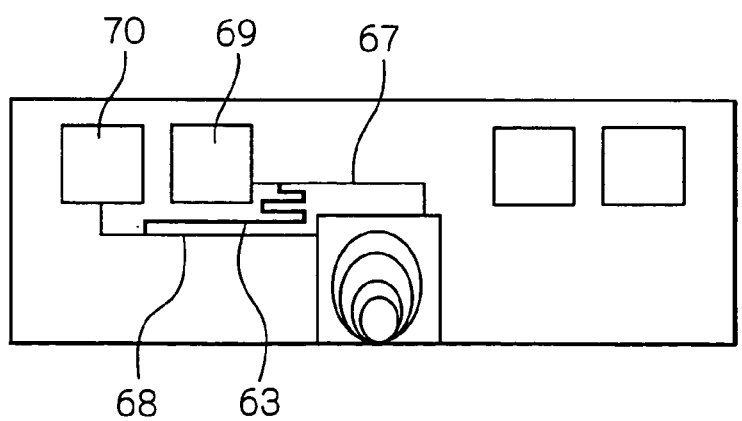
FIG. 6 shows an elevation view schematically illustrating a configuration of a TMR head seen from its element-forming surface as another embodiment according to the present invention.

FIG. 6 schematically illustrates a configuration of a TMR head seen from its element-forming surface as another embodiment according to the present invention.

In this embodiment, a resistor element 63 is connected between lead conductors 67 and 68 in parallel with the TMR element. These lead conductors 67 and 68 electrically connect the TMR element with electrode terminals 69 and 70. In modifications, a resistor element may be connected between the electrode terminals 69 and 70 in parallel with the TMR element.

Another configurations, operations and advantages of this embodiment are substantially the same as those of the embodiment of FIG. 1.

According to the present invention, structures of the TMR element and the resistor element are not limited to the above-mentioned embodiments and modifications but other various structures can be of course applicable.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A thin-film magnetic head comprising a tunnel magnetoresistive effect element and a resistor element connected in parallel with said tunnel magnetoresistive effect element, a resistance value $R_{TMR}$ of said tunnel magnetoresistive effect element itself being $R_{TMR} \geq 240\Omega$, a product RA of the resistance value of said tunnel magnetoresistive effect element itself and a cross-sectional area of said tunnel magnetoresistive effect element being $RA \geq 3 \: \Omega \cdot \mu m^2$, and a resistance value $R_{PARA}$ of said resistor element being $R_{PARA} \leq 480\Omega$.

2. The thin-film magnetic head as claimed in claim 1, wherein said thin-film magnetic head further comprises an upper electrode layer and a lower electrode layer connected to said tunnel magnetoresistive effect element, and wherein said resistor element is formed between said upper electrode layer and said lower electrode layer.

3. The thin-film magnetic head as claimed in claim 1, wherein said thin-film magnetic head further comprises electrode terminals and lead conductors connected between said tunnel magnetoresistive effect element and said electrode terminals, and wherein said resistor element is formed between said lead conductors.

4. The thin-film magnetic head as claimed in claim 1, wherein said tunnel magnetoresistive effect element further comprises a multi-layered structure of an under layer, a pinning layer, a pinned layer, a tunnel barrier layer and a free layer which are sequentially laminated.

5. A thin-film magnetic head comprising a tunnel magnetoresistive effect element and a resistor element connected in parallel with said tunnel magnetoresistive effect element, a resistance value $R_{TMR}$ of said tunnel magnetoresistive effect element itself being $R_{TMR} \geq 240\Omega$, a product RA of the resistance value of said tunnel magnetoresistive effect element itself and a cross-sectional area of said tunnel magnetoresistive effect element being $RA \geq 3 \: \Omega \cdot \mu m^2$, and a combined resistance value $R_{TOTAL}$ of the resistance value $R_{TMR}$ of said tunnel magnetoresistive effect element itself and a resistance value of said resistor element being $R_{TOTAL} \leq 160\Omega$.

6. The thin-film magnetic head as claimed in claim 5, wherein said thin-film magnetic head further comprises an upper electrode layer and a lower electrode layer connected to said tunnel magnetoresistive effect element, and wherein said resistor element is formed between said upper electrode layer and said lower electrode layer.

7. The thin-film magnetic head as claimed in claim 5, wherein said thin-film magnetic head further comprises electrode terminals and lead conductors connected between said tunnel magnetoresistive effect element and said electrode terminals, and wherein said resistor element is formed between said lead conductors.

8. The thin-film magnetic head as claimed in claim 5, wherein said tunnel magnetoresistive effect element further comprises a multi-layered structure of an under layer, a pinning layer, a pinned layer, a tunnel barrier layer and a free layer which are sequentially laminated.

* * * * *